Sept. 3, 1935.  J. G. COLLINS  2,013,235
VIBRATING DETECTOR FOR AUTOMOBILES
Filed Jan. 15, 1932  2 Sheets-Sheet 1
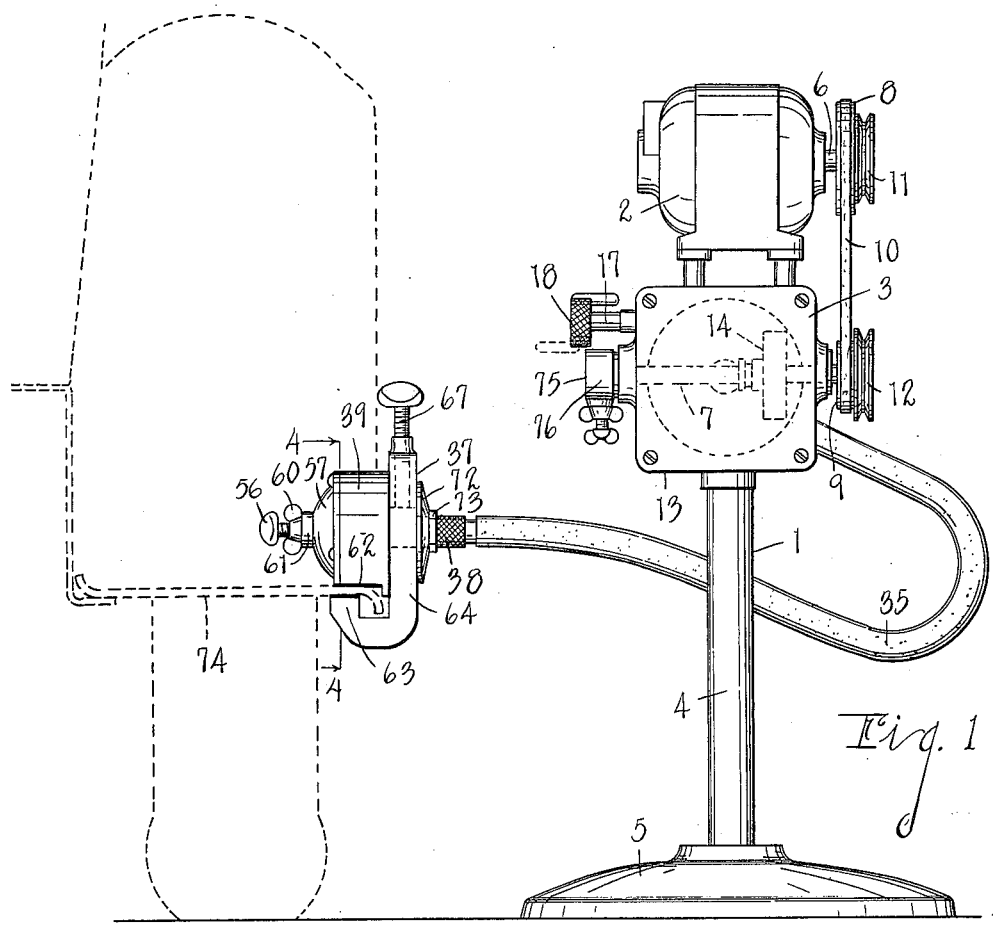
Fig. 1
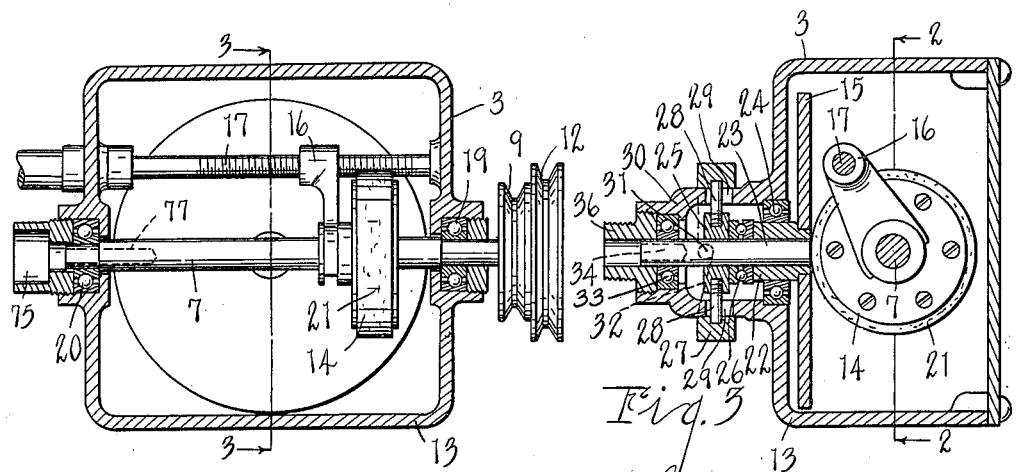
Fig. 2
Fig. 3
INVENTOR
James G. Collins
BY Chappell & Earl
ATTORNEYS Sept. 3, 1935.   J. G. COLLINS   2,013,235
VIBRATING DETECTOR FOR AUTOMOBILES
Filed Jan. 15, 1932   2 Sheets-Sheet 2
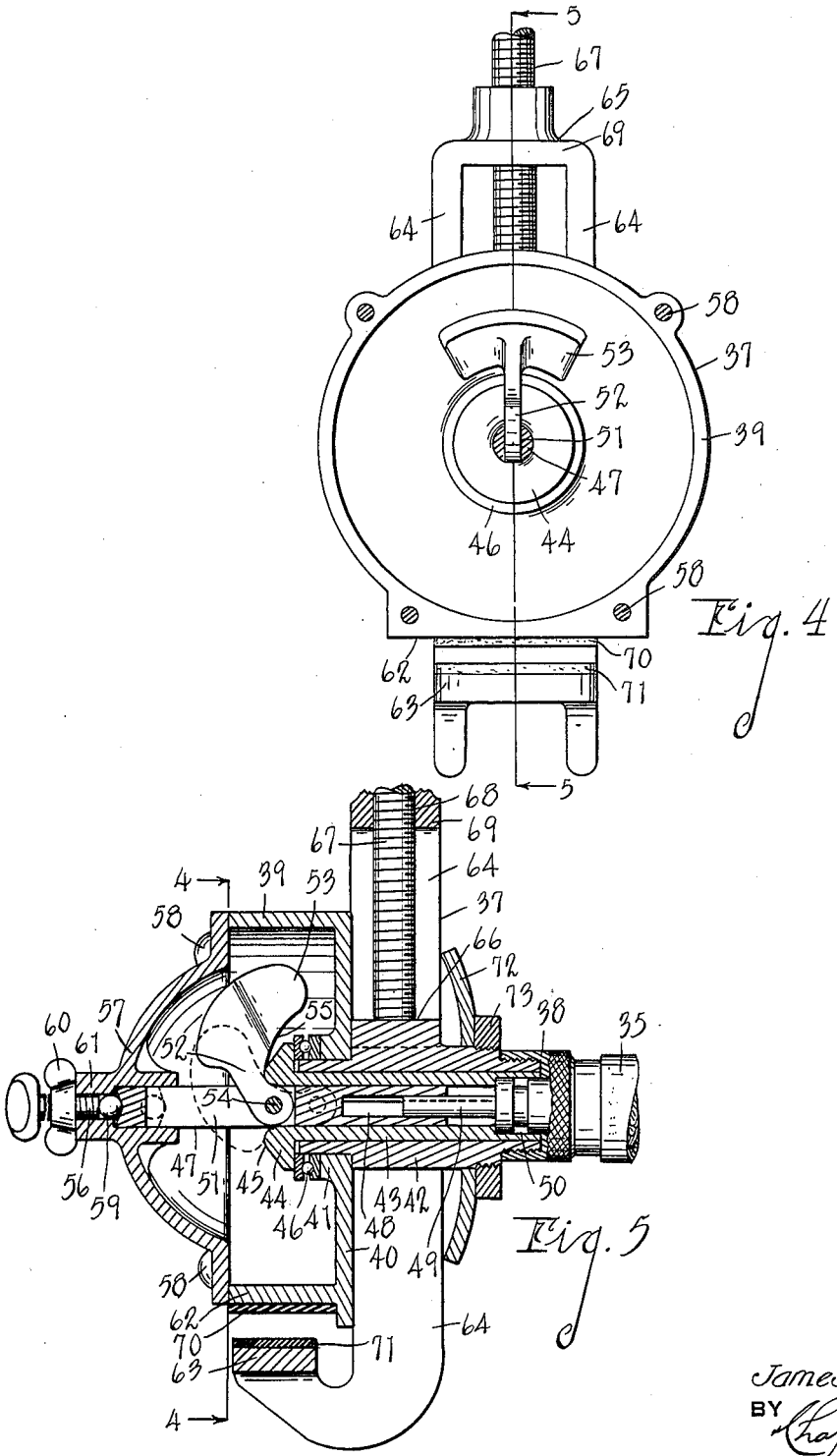
INVENTOR
James G. Collins
BY Chappell & Earl
ATTORNEYS Patented Sept. 3, 1935

2,013,235

UNITED STATES PATENT OFFICE 2,013,235

VIBRATING DETECTOR FOR AUTOMOBILES

James G. Collins, Kalamazoo, Mich., assignor to Atlas Press Company, Kalamazoo, Mich.

Application January 15, 1932, Serial No. 586,759

10 Claims. (Cl. 73—51)

The main object of this invention is to provide improved means for locating undesirable noises such as rattles and squeaks and any noise due to loose joints in automobiles, vehicle bodies, and the like.

A still further object is to provide a device of this character that is simple in construction, economical to manufacture, and efficient in operation.

Objects relating to details and economies of the invention will appear from the description to follow. The invention is defined and pointed out in the claims.

A structure which is a preferred embodiment of the invention is illustrated in the accompanying drawings in which:

Fig. 1 is an elevational view of apparatus embodying the invention applied to the body of an automobile, shown in dotted lines.

Fig. 2 is a transverse section taken on line 2—2 of Fig. 3.

Fig. 3 is a vertical section taken on line 3—3 of Fig. 2.

Fig. 4 is an enlarged fragmentary detail section of the vibrator taken on a line corresponding to line 4—4 of Figs. 1 and 5, and Fig. 5 is a fragmentary transverse vertical section taken on line 5—5 of Fig. 4.

Referring to the drawings, numeral 1 indicates my improved device which comprises a motor 2 and a speed changing mechanism 3 mounted on the standard 4 of a pedestal 5. The shaft 6 of the motor 2 and the shaft 7 of the speed changing mechanism 3 are provided with pulleys 8 and 9, respectively, which are connected by the belt 10. Extra pulleys 11 and 12 are provided on the shafts for changing the transmitted speed ratio between the motor and the speed changing mechanism.

As illustrated by Figs. 2 and 3, the speed changing mechanism is disposed within the housing 13 and consists of the friction gear or wheel 14 driven by the shaft 7 and frictionally engaging the disk 15. The wheel 14 is moved longitudinally relative to the shaft 7 by the traveling nut 16 which is carried by screw 17 journaled in the casing 13 in parallel relation to the shaft 7. One end of the screw 17 extends to the outside of the casing 13 and is provided with a knurled finger piece 18 for turning the screw 17 to adjust the longitudinal position of the wheel 14 on the shaft 7. The shaft 7 is journaled to the casing 13 at 19 and 20. Varying the wheel 14 longitudinally relative to the shaft 7 changes its radial point of contact with the friction disk 15 to thereby change the transmitted speed ratio between the wheel and the disk. The periphery of the wheel 14 is provided with a friction covering 21 of leather, rubber or the like for preventing slipping of the wheel relative to the disk.

The disk 15 is carried by the sleeve 22 which embraces the spindle 23 and is journaled to the casing 13 at 24, the spindle 23 and the sleeve 22 being splined together. The outer end of the sleeve 22 is separated from the clutch collar 25 by the thrust ball bearing 26. The clutch collar 25 is connected to the outer clutch collar 27 by the radial pins 28 which extend through slots 29 provided therefor in the walls of the extension 30 of the housing 13. The latter is provided with a stud 31 for coaction with the cammed surface 32 of the outer collar 27. The arrangement is such that when the collar 27 is rotated in a clockwise direction about the extension 30, the stud 31 engages the cammed surface 32 causing the clutch assembly to move the sleeve 22 and the disk 15 toward the friction wheel 14. By rotating the outer clutch collar 27 in a counter-clockwise direction the pressure holding the disk 15 against the wheel 14 is relieved. The outer clutch collar 27 is provided with a lock or clamp for holding it in its adjusted position.

The outer end of the spindle 23 is separated from the extension 30 by the ball bearing 33 and is provided with an internal socket 34 which is splined to receive the end of the flexible coupling 35 which is attached to the extension 30 through the nipple 36. The outer end of the flexible coupling 35 is connected to the vibrator 37 at 38.

The vibrator 37 consists of an annular casing 39 having a wall 40 provided with a flanged opening 41 in which is mounted the journal housing 42. The sleeve 43 is journaled within the housing 42 and is provided with an end flange 44 having a conical surface 45. The flange 44 is separated from the flange of the opening 41 by the ball bearing 46. The shaft 47 is slidably disposed within the sleeve 43 for longitudinal movement relative thereto. The inner end of the shaft 47 is provided with a socket 48 receiving the connecting pin 49 of the flexible coupling 35, the socket 48 and the pin 49 being splined, whereby the shaft 47 is free to move longitudinally relative to the pin 49 which is journaled at 50 to the sleeve 43 for only rotational movement.

The shaft 47 is provided with a longitudinal slot 51 near its outer end in which is disposed the radial arm 52 of the weight member 53, the arm 52 being pivoted to the shaft at 54 for movement in a radial plane relative to the shaft. The arm 52 is provided with a curved surface 55 which coacts with the conical surface 45 and flange 44 at the end of sleeve 43, the arrangement being such that when the shaft 47 is moved into the sleeve 43 by the adjusting screw 56 the radial position of the weight member 53 relative to the shaft 47 is changed. The screw 56 is threaded to an opening provided therefor in the spherical cap 57 which is secured to the casing 39 by bolts 58. The ends of the shaft 51 and the screw 56 are separated by the ball bearing 59 which consists of a single steel sphere. The screw 56 is locked in its adjusted position by the clamping nut 60 carried thereby for engagement with the integral nipple 61 on the cover 57.

The periphery of the casing 39 is provided with a base portion 62 having a flat surface which constitutes a clamping jaw for attaching the vibrator to the work or part of the automobile to be vibrated. The jaw 62 is arranged for coaction with the opposed jaw 63 which is carried by the lower ends of the side members 64 of the inverted U-shaped clamping member 65. The sides 64 of the clamping member are slidably disposed at the sides of the journal housing 42 which is provided with a flat bearing surface 66 against which the end of the adjusting screw 67 abuts. The adjusting screw 67 is threaded to the vertical opening 68 of the cross piece 69 of the U-shaped clamping member 65 so that the jaws 62 and 63 may be drawn together into engagement with the work to be clamped. The jaws 62 and 63 are preferably provided with surfaces 70 and 71, respectively, of anti-scratching material such as felt, rubber, or the like.

The clamping member 65 is resiliently held in slidable engagement with the wall 40 of the casing 39 by the spring clamp or washer 72 which engages the outside of the clamping member and is held in clamping position relative thereto by the nut 73 which is threaded to the journal housing 42.

In the operation of the device, the vibrator 37 is clamped to the suspected part of the automobile such as the running board 74, Fig. 1, and the motor 2 is connected to a suitable source of energy. The unbalanced weight 53 is thereby driven at a relatively high speed causing the vibrator 37 to shake the part 74 at its amplitude and frequency of vibration. When vibrated in this manner, the suspected part 74 will squeak or rattle, thereby indicating the exact location of the trouble which may then be corrected by tightening the proper bolts or the like. While the vibrator 37 is attached to the part and in operation, the frequency and amplitude of the vibrations may be changed by varying the speed and changing the radial position of the unbalanced weight 53 by the adjusting screw 56. In this manner, the entire range of vibrations may be covered while the device is in operation. Since certain parts rattle or squeak only at certain frequencies, this is highly desirable in detecting noises which are otherwise undetectable.

The flexible coupling 35 permits the vibrator 37 to be clamped to any part of the machine without affecting its operation.

It is obvious that various changes and modifications may be made in the details of construction and design of the above specifically described embodiments of this invention without departing from the spirit thereof, such changes and modifications being restricted only by the scope of the following claims.

Having thus described my invention, what I claim as new and desire to secure by Letters Patent is:

1. In a device of the class described, the combination of a casing having a flat peripheral portion constituting a work clamping jaw, a journal housing extending through a wall of said casing, a U-shaped jaw member slidably embracing said housing and having a work clamping jaw coacting with said first named jaw, a screw threaded to the cross piece of said jaw member and engaging said journal housing for moving said jaws towards each other, a spring washer carried by said housing and engaging said jaw member, a nut threaded to said housing and forcing said spring washer into contact with said jaw member, a sleeve having an annular end flange journaled to said housing, a shaft slidably carried by said sleeve for longitudinal movement relative thereto and having a longitudinal slot, a weight member having an arm extending into said slot and pivoted to said shaft for movement in a radial plane, a spherical cover on said casing and having a bearing socket receiving the end of said shaft and a threaded opening in line therewith, a screw threaded to said opening for adjusting the longitudinal position of said shaft to change the radial position of said weight member, a ball bearing disposed between the ends of said shaft and said screw, a clamping nut carried by said screw and engaging said cover for locking said screw in an adjusted position, means for rotating said shaft and sleeve including a pin journaled to said sleeve and splined to said shaft, and means for changing the speed of said rotating means.

2. In a device of the class described, the combination of a casing having a work clamping jaw, a journal housing extending through a wall of said casing, a jaw member slidably embracing said housing and having a work clamping jaw coacting with said first named jaw, a screw threaded to the cross piece of said jaw member and engaging said journal housing for moving said jaws towards each other, a spring washer carried by said housing and engaging said jaw member, a nut threaded to said housing and forcing said spring washer into contact with said jaw member, a sleeve having an annular end flange journaled to said housing, a shaft slidably carried by said sleeve for longitudinal movement relative thereto and having a longitudinal slot, a weight member having an arm extending into said slot and pivoted to said shaft for movement in a radial plane, a cover on said casing having a bearing socket receiving the end of said shaft and a threaded opening in line therewith, a screw threaded to said opening for adjusting the longitudinal position of said shaft to change the radial position of said weight member, a bearing disposed between the ends of said shaft and said screw, means for rotating said shaft and sleeve, and means for changing the speed of said rotating means.

3. In a device of the class described, the combination of a casing having a work clamping jaw, a journal housing extending through the back wall of said casing, an inverted U-shaped jaw member slidably embracing said housing and having a work clamping jaw opposite said first named jaw, means carried by said jaw member and engaging said journal housing for moving said jaws relative to each other, a spring carried by said housing and engaging said jaw member, means threaded to said housing for forcing said spring into contact with said jaw member, a sleeve having an inner end flange journaled to said housing, a shaft slidably carried by said sleeve for longitudinal movement relative thereto and having a socket in its outer end, a weight having a curved arm pivoted to said shaft for radial movement and engaging said flange, a cover on said casing having a socket receiving the inner end of said shaft, means threaded to said cover for adjusting the longitudinal position of said shaft to change the radial position of said weight, means for locking said last named means in an adjusted position, means for rotating said shaft and sleeve including a coupling pin journaled to said sleeve and splined to said shaft end socket, and means for changing the speed ratio between said rotating means and said shaft.

4. In a device of the class described, the combination of a casing, a journal housing extending through the wall of said casing, a sleeve having an inner annular end flange journaled to said housing, a shaft slidably carried by said sleeve for longitudinal movement relative thereto and having a longitudinal slot, a weight member having an arm extending into said slot and pivoted to said shaft for movement in and out of said sleeve, a spherical cover on said casing and having a bearing socket receiving the end of said shaft and a threaded opening in line therewith, a screw threaded to said opening for adjusting the longitudinal position of said shaft to change the radial position of said weight member, a bearing disposed between the ends of said shaft and said screw, a clamping nut carried by said screw and engaging said cover for locking said screw in an adjusted position, means for rotating said shaft and sleeve including a pin journaled to said sleeve and splined to said shaft, and means for changing the speed of said shaft.

5. In a device of the class described, the combination of a casing, a journal housing extending through the wall of said casing, a sleeve having an inner annular end flange journaled to said housing, a shaft slidably carried by said sleeve for longitudinal movement relative thereto and having a longitudinal slot, a weight member having an arm extending into said slot and pivoted to said shaft for movement in and out of said sleeve, a spherical cover on said casing and having a bearing socket receiving the end of said shaft and a threaded opening in line therewith, a screw threaded to said opening for adjusting the longitudinal position of said shaft to change the radial position of said weight member, means for rotating said shaft and sleeve, and means for changing the speed of said shaft.

6. In an apparatus for locating rattles in vehicles or the like, the combination of a motivating means, an off-balance fly wheel adapted to be driven thereby and having means for varying the balance thereof, a flexible drive shaft coupling from said motivating means to said fly wheel, a support on which said fly wheel is mounted for rotation, and a clamping device adapted to attach said support to the part to be tested whereby said part may be vibrated, and means for regulating the speed of rotation of said fly wheel.

7. In an apparatus for locating rattles in vehicles or the like, the combination of a motivating means, an off-balance fly wheel adapted to be driven thereby, a flexible drive shaft coupling from said motivating means to said fly wheel, a support on which said fly wheel is mounted for rotation, and a clamping device adapted to attach said support to the part to be tested whereby said part may be vibrated, and means for regulating the speed of rotation of said fly wheel.

8. In an apparatus for locating rattles in vehicles or the like, the combination of a motivating means, an off-balance fly wheel adapted to be driven thereby and having means for varying the balance thereof, a flexible drive shaft coupling from said motivating means to said fly wheel, and a clamping device adapted to attach said fly wheel to the part to be tested whereby said part may be vibrated, and means for regulating the speed of rotation of said fly wheel.

9. In an apparatus for locating rattles in vehicles or the like, the combination of an electric motor, an off-balance fly wheel adapted to be driven thereby and having means for varying the balance thereof, a flexible drive shaft coupling from said electric motor to said fly wheel, and a clamping device adapted to attach said fly wheel to the part to be tested whereby said part may be vibrated, and means for regulating the speed of rotation of said fly wheel.

10. In an apparatus for locating rattles in vehicles, or the like, the combination of a motivating means, an off-balance fly wheel adapted to be driven thereby, a flexible drive shaft coupling from said motivating means to said fly wheel, and a clamping device adapted to attach said fly wheel to the part to be tested whereby said part may be vibrated, and means for regulating the speed of rotation of said fly wheel.

JAMES G. COLLINS.